（12） United States Patent
Kim

(10) Patent No.: US 9,116,373 B2
(45) Date of Patent: Aug. 25, 2015

(54) LIQUID CRYSTAL DISPLAY DEVICE INCLUDING A BACKLIGHT UNIT ASSEMBLY AND A BOTTOM COVER

(75) Inventor: Won Tae Kim, Daegu (KR)

(73) Assignee: LG DISPLAY CO., LTD., Seoul (KR)

( * ) Notice: Subject to any disclaimer, the term of this patent is extended or adjusted under 35 U.S.C. 154(b) by 458 days.

(21) Appl. No.: 13/339,220

(22) Filed: Dec. 28, 2011

(65) Prior Publication Data

US 2013/0050607 A1    Feb. 28, 2013

(30) Foreign Application Priority Data

Aug. 26, 2011   (KR) ........................ 10-2011-0086076

(51) Int. Cl.
*G02F 1/1333*    (2006.01)
*F21V 8/00*    (2006.01)
*G02F 1/1335*    (2006.01)

(52) U.S. Cl.
CPC ........ *G02F 1/133308* (2013.01); *G02B 6/0088* (2013.01); *G02F 1/133608* (2013.01); *G02F 2001/133314* (2013.01); *G02F 2201/503* (2013.01)

(58) Field of Classification Search
CPC .................... G02F 1/133308; G02F 1/133608; G02F 2001/133314; G02F 2201/503; G02B 6/0086
USPC ............................................................ 349/60
See application file for complete search history.

(56) References Cited

U.S. PATENT DOCUMENTS

| 6,760,083 | B2* | 7/2004 | Lai ................................. 349/58 |
| 7,695,181 | B2* | 4/2010 | Kim et al. ..................... 362/632 |
| 2009/0195726 | A1 | 8/2009 | Na | |

FOREIGN PATENT DOCUMENTS

CN           2852181 Y    12/2006

* cited by examiner

*Primary Examiner* — Paisley L Arendt
(74) *Attorney, Agent, or Firm* — Birch, Stewart, Kolasch & Birch, LLP

(57) ABSTRACT

An LCD device is discussed. The LCD device includes: an LCD panel; a backlight unit configured to apply light to the LCD panel; a bottom cover configured to receive the LCD panel and the backlight unit and include a bottom surface, which supports the backlight unit, and bending processed hemming portions extended from 4 edges of the bottom surface; and a support main disposed between the bottom cover and the outsides of the LCD panel and the backlight unit, wherein the bottom cover further includes stepped portions positioned at both ends of the hemming portion and inwardly inclined at a fixed angle from the edge of the bottom surface.

10 Claims, 5 Drawing Sheets

LIQUID CRYSTAL DISPLAY DEVICE INCLUDING A BACKLIGHT UNIT ASSEMBLY AND A BOTTOM COVER

CROSS-REFERENCE TO RELATED APPLICATION

This application claims priority under 35 U.S.C. 119 to Korean Patent Application No. 10-2011-0086076, filed on Aug. 26, 2011, which is hereby incorporated by reference in its entirety.

BACKGROUND

1. Field of the Disclosure

This disclosure relates to a liquid crystal display (LCD) device, and more particularly to an LCD device adapted to enhance its strength.

2. Description of the Related Art

The importance of display devices as visual information media is highlighted in the recent information society. The display devices must meet the requirements such as low power consumption, slimness, light weight, high definition and so on, in order to occupy a prominent position in the future.

Such display devices can be classified as either a luminous type able to emit light by itself or a non-luminous type which is unable to emit light by itself. The luminous type display devices include CRTs (Cathode Ray Tubes), EL (Electro Luminescence) display devices, LED (Light Emission Diode) display devices, VFD (Vacuum Fluorescent Display) devices, FED (Field Emission Display) devices, PDPs (Plasma Display Panels), or others. The non-luminous type display devices include LCD devices or others.

The LCD device controls the light transmittance in each of the pixels arranged in a matrix shape by respectively applying image signals to the pixels, in order to display a desired image.

Such an LCD device is configured with an LCD panel, a backlight unit, and a receptacle for receiving the LCD panel and the backlight unit.

The receptacle includes a bottom cover. The bottom cover is configured with a bottom surface and four side walls extended from edges of the bottom surface.

In other words, the bottom cover has the cross-sectional structure of a right-angle shape. Due to this, a reactive moment of the bottom cover is lower compared to an external moment applied to the bottom cover when an external force is pressed to the bottom cover. As such, the bottom cover must have a low strength or it is difficult for the bottom cover to provide a sufficiently high strength.

In view of this point, methods adapted to enhance the strength of the bottom cover must be developed as soon as possible.

BRIEF SUMMARY

Accordingly, the present embodiment is directed to an LCD device that substantially obviates one or more of problems due to the limitations and disadvantages of the related art.

An object of the present embodiments is to provide an LCD device that is adapted to enhance the strength by modifying the structure of a bottom cover.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

An LCD device according to one general aspect of the present disclosure includes: an LCD panel; a backlight unit configured to apply light to the LCD panel; a bottom cover configured to receive the LCD panel and the backlight unit and include a bottom surface, which supports the backlight unit, and bending processed hemming portions extended from 4 edges of the bottom surface; and a support main disposed between the bottom cover and the outsides of the LCD panel and the backlight unit, wherein the bottom cover further includes stepped portions positioned at both ends of the hemming portion and inwardly inclined at a fixed angle from the edge of the bottom surface.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
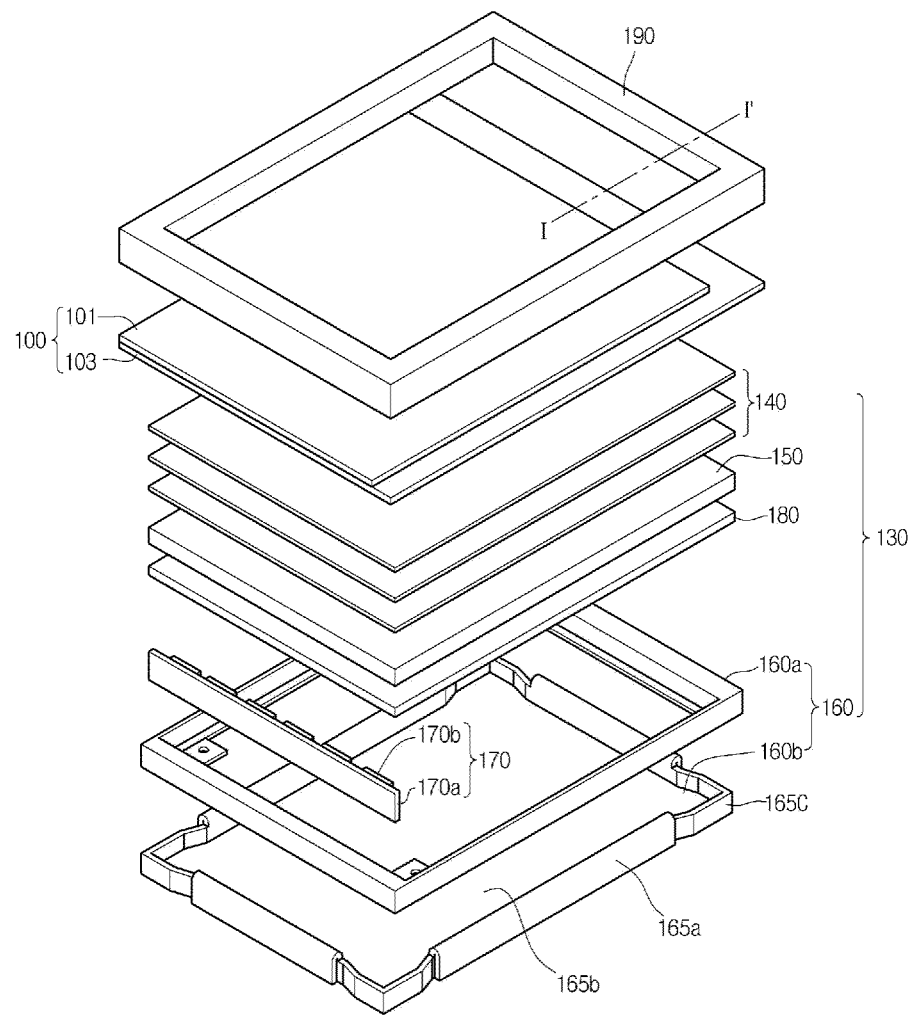
FIG. 1 is a schematically disassembled perspective view showing an LCD device according to a first embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. In the drawings, the size, thickness and so on of a device can be exaggerated for convenience of explanation. Wherever possible, the same reference numbers will be used throughout this disclosure including the drawings to refer to the same or like parts.

FIG. 1 is a schematically disassembled perspective view showing an LCD device according to a first embodiment of the present disclosure.

Referring to FIG. 1, the LCD device according to an embodiment of the present disclosure includes: an LCD panel 100 displaying images; a backlight unit 130 applying light to the LCD panel 100; a receptacle 160 receiving the LCD panel 100 and the backlight unit 130; and a top case 190 encompassing the LCD panel 100 and receptacle 160.

The LCD panel 100 includes a first substrate 101, a second substrate 103 disposed to face the first substrate 101, and a liquid crystal layer (not shown) interposed between the two substrates 101 and 103.

The second substrate 103 includes a plurality of pixels which are arranged in a matrix shape. Each of the pixels includes a pixel electrode which is formed in a pixel region defined by gate and data lines. The gate lines are formed to extend in a first direction. The data lines are formed to extend in a second direction perpendicularly crossing the first direction. Also, each of the pixels includes a thin film transistor TFT formed in an intersection of the gate and data lines. The thin film transistor TFT is connected to the gate line, the data line and the pixel electrode.

The LCD panel 100 can be loaded with a gate driver for driving the gate lines and a data driver for driving the data lines. In this case, the gate and data drivers can be mounted to the second substrate 103 in the shape of IC (Integrated Circuit) chips The first substrate 101 includes red, green and blue color filters R, G and B which are formed in a pixel size through a thin film formation process. Also, the first substrate 101 includes a common electrode formed to face the pixel electrodes. As such, the liquid crystal layer allows its molecules to be realigned by a voltage which is applied between the pixel electrode and the common electrode, thereby controlling the transmittance of light passing through it from the backlight unit 120.

The backlight unit 130 includes a light source array 170, a light guide plate 150, optical sheets 140, and reflective sheet 180. The light source array 170 is configured to generate light. The light guide plate 150 guides light emitted from the light source array 170 to be output in a specific direction. The optical sheets 140 are used to scatter and diffuse light being output from the light guide plate 150. The reflective sheet 180 is disposed under the light guide plate 150 and used to reflect light downwardly progressing from the light guide plate 150.

The light source array 170 includes a light source 170b disposed on a printed circuit board 170a. The light source 170b is configured to emit light. The printed circuit board 170a is configured to apply an electrical signal to the light source 170b.

More specifically, the light source 170b can be configured with a plurality of light emission diodes (LEDs) which are used as spot light sources. In this case, the plurality of LEDs each emitting light can be arranged in either one side surface of the light guide plate 150 or both side surfaces of the light guide plate 150 opposite to each other.

The light guide plate 150 has to have a high light transmittance and a high light reflective-index in order to minimize a total reflection of light and light leakage by the absorption of its formation material. Moreover, the light guide plate 150 must not only bend while an external force is applied, but also be restored to the original state when the external force is removed. To this end, the light guide plate 150 must have flexibility and a sufficient elasticity together with a critical hardness. In other words, the light guide plate 150 requires a material with such properties. Actually, the light guide plate 150 can be formed from a resin with the above-mentioned properties. More specifically, one of high transparency-silicon and polyurethane-based materials can be used in the formation of the light guide plate 150.

The optical sheets 140 enables light being output from an output surface of the light guide plate 150 to be enhanced in its optical properties. To this end, the optical sheets 140 can include a diffusion sheet, a prism sheet and a protective sheet.

The reflective sheet 180 received within the receptacle 160 is disposed to face the lower surface of the light guide plate 150. The reflective sheet 180 reflects light being downwardly output from the light guide plate 150 among light entered into the light guide plate 150. Light reflected by the reflective sheet 180 re-enters the light guide plate 150.

The receptacle 160 includes a bottom cover 160b and a support main 160a.

The bottom cover 160b includes a bottom surface 165b and four side walls 165a. The bottom surface is used for supporting the backlight unit 130. The side walls 165a is formed to extend from edges of the bottom surface 165b.

Each of the four side walls 165a includes a hemming portion in which a bending process is performed. For the convenience of explanation, the side wall 165a will be referred to as a hemming portion.

The bending-processed hemming portion 165a formed to extend from an edge of the bottom surface 165b is separated from corners of the bottom surface 165 by a fixed distance (for example, a distance of less than 1.5 mm).

The bottom cover 160b further includes other side walls 165c formed at the corners of the bottom surface 165b. Another side wall 165c is formed to have a lower height than the hemming portion 165a and used to protect corners of the LCD panel 100 and the backlight unit 130 which are surrounded with the support main 160a.

Also, the hemming portion 165a includes stepped portions 161 formed at both ends. The stepped portion 161 is inclined inwardly from the corner of the bottom surface 165b at a fixed angle. Alternatively, the stepped portion 161 can be formed to have a curved surface or an unevenly patterned surface, instead of the flat surface inclined at the fixed angle.

The bending-processed hemming portions allow the cross-sectional coefficient of the bottom cover 160b to become larger. The stepped portions 161 enable the reactive moment of the bottom cover 160b against an externally applied moment to become higher when an external force is applied to the bottom cover 160b. In accordance therewith, the strength of the bottom cover 160b can be enhanced.

The stepped portions 161 can make additional spaces to be provided to the corners of the bottom cover 165. As such, the thickness of the support main 160a combined with the bottom cover 160b can increase. The thickness increment enhances the strength of the support main 160a. Therefore, an impact caused by an external force and transferred to the LCD panel 100 and the backlight unit 130, which are supported by the support main 160a, can be minimized when the external force is applied to the bottom cover 160b.

In this manner, the LCD device according to an embodiment of the present disclosure allows not only the four side walls of the bottom cover 160b to be modified into the bending-processed hemming portions 165a but also the stepped portions 161 to be provided at both ends of each of the hemming portions 165a. Accordingly, the strength of the bottom cover 160b can be enhanced.

Figure 2:
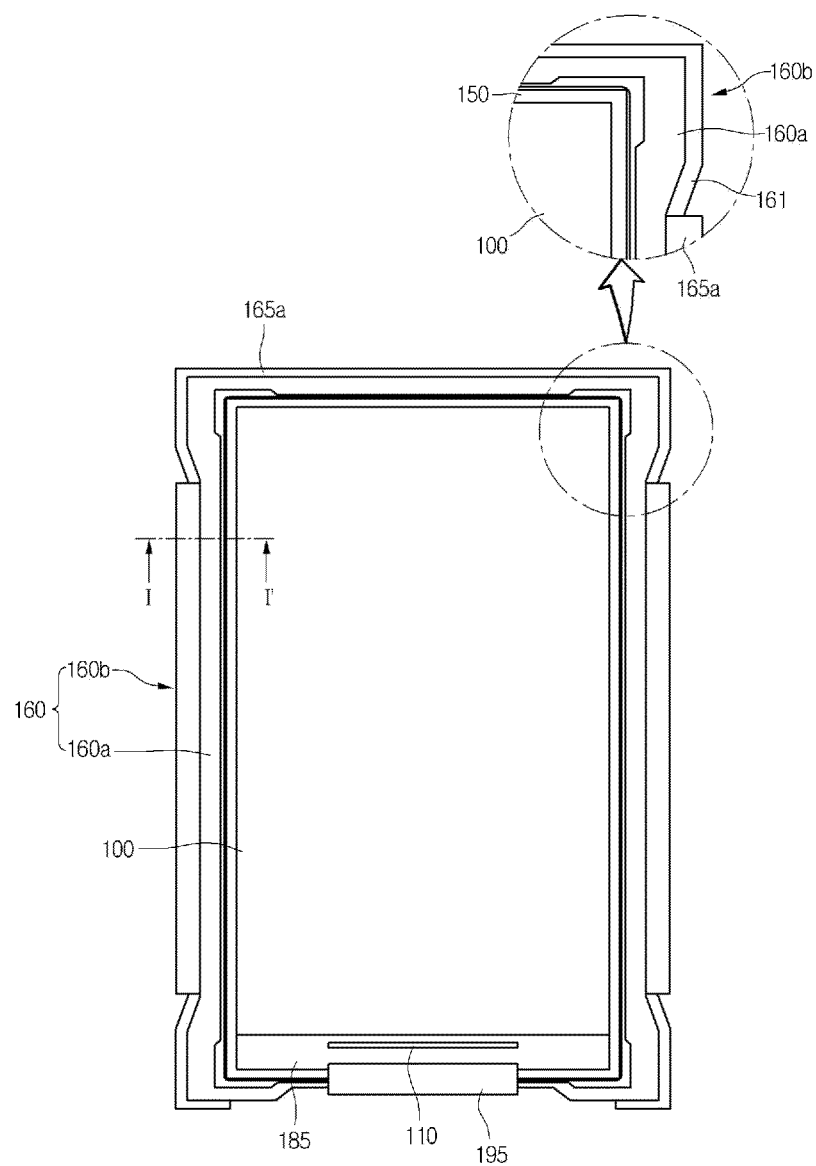
FIG. 2 is a planar view showing an LCD panel which is received in the receptacle shown in FIG. 1.
Figure 3:
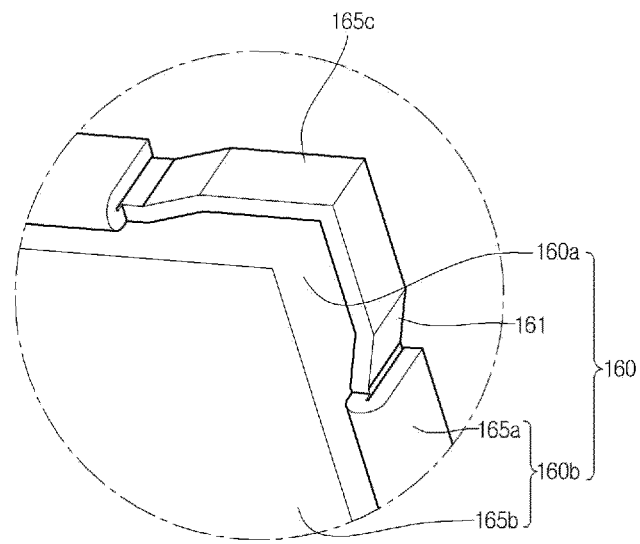
FIG. 3 is a detailed cross-sectional view showing a part of the receptacle in FIG. 1.

FIG. 2 is a planar view showing an LCD panel which is received in the receptacle shown in FIG. 1. FIG. 3 is a detailed cross-sectional view showing a part of the receptacle in FIG. 1.

Referring to FIGS. 2 and 3, the receptacle 160 sequentially receives the backlight unit ("130" in FIG. 1) and the LCD panel 100.

Under the LCD panel 100 received within the receptacle 160, a printed circuit board 185 loaded with a driver 110 for driving the LCD panel 100 is disposed. The printed circuit board 185 includes signal lines electrically connected to the driver 110. As such, the printed circuit board 185 can apply driving voltages to the driver 110 through the signal lines. Also, the printed circuit board 185 is electrically connected to a flexible printed circuit board 195, in order to receive a plurality of signals and voltages from a system (not shown).

The bottom cover 160b of the receptacle 160 includes a bottom surface 165b and four bending-processed hemming portions 165a extended from the edges of the bottom surface 165b. Also, the bottom cover 160b includes side walls 165c formed at corners of the bottom surface 165b adjacent to the four hemming portions 165a. The side walls 165c are formed to have a lower height than those of the hemming portions 165a. The bottom cover 160b further includes stepped portions 161 formed at both ends of each hemming portion 165a. The stepped portions 161 are formed to inwardly incline at a fixed angle from the edge of the bottom surface 165b.

Figure 4:
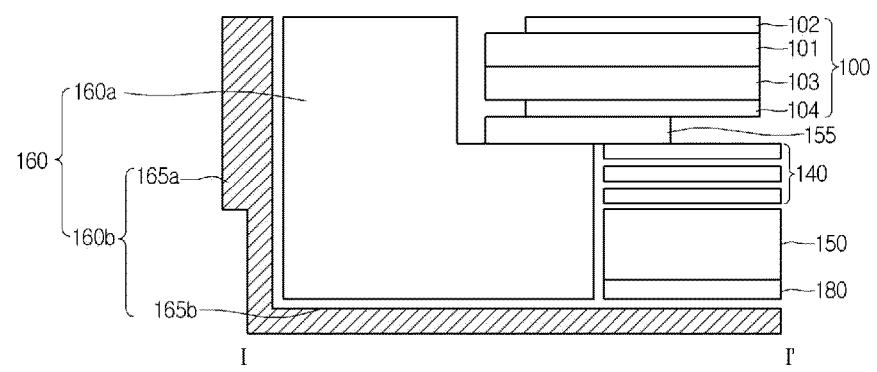
FIG. 4 is a cross-sectional view showing the LCD device taken along a ling I-I' in FIG. 1.

FIG. 4 is a cross-sectional view showing the LCD device taken along a ling I-I' in FIG. 1.

As shown in FIGS. 1 and 4, the backlight unit including the reflective sheet 180, the light guide plate 150 and optical sheets 140 is disposed on the bottom surface 165b of the bottom cover 160b combined with the support main 160a. Subsequently, the LCD panel 100 is also received within the bottom cover 160b.

The LCD panel 100 includes first and second substrates 101 and 103 and a liquid crystal layer (not shown) interposed between the two substrates 101 and 103. A first polarizing film 102 can be formed on the first substrate 101. Also, a second polarizing film 104 can be formed on the outer surface of the second substrate 104.

The first and second polarizing films 102 and 104 have axes perpendicular to each other. Such first and second polarizing films 102 and 104 transmit only light which oscillates in a fixed direction, in order to polarize incident light.

The LCD panel 100 is disposed above the optical sheets 140. More specifically, the LCD panel 100 is disposed on an adhesive member 155. As such, the LCD panel 100 can be fastened to the backlight unit 130 by the adhesive member 155.

The bottom cover 160b includes the bending-processed hemming portions 165a extended from the edges of the bottom surface 165b.

Figure 5:
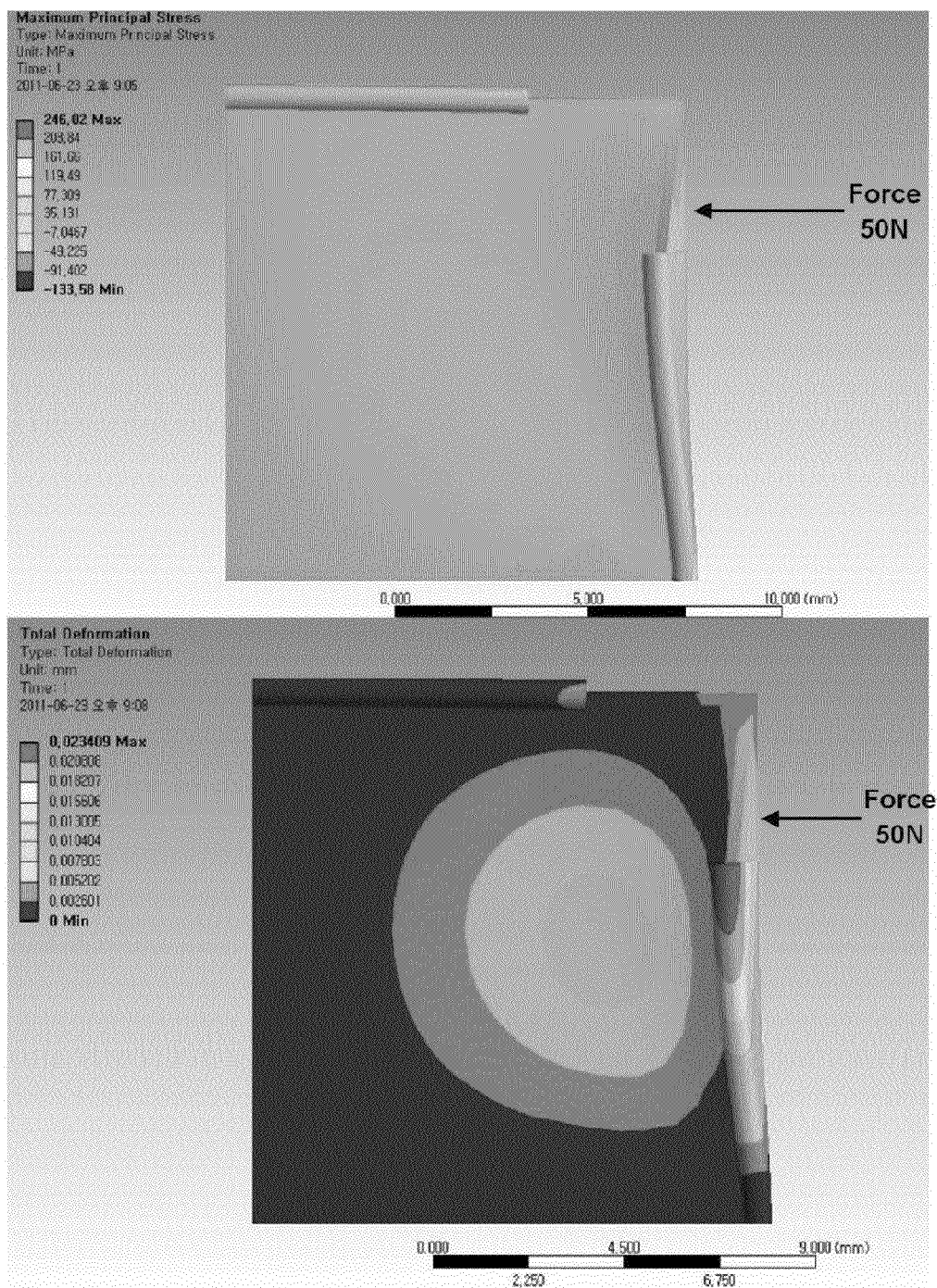
FIG. 5 is a data sheet including simulation resultants for the strength of a bottom cover with hemming portions.
Figure 6:
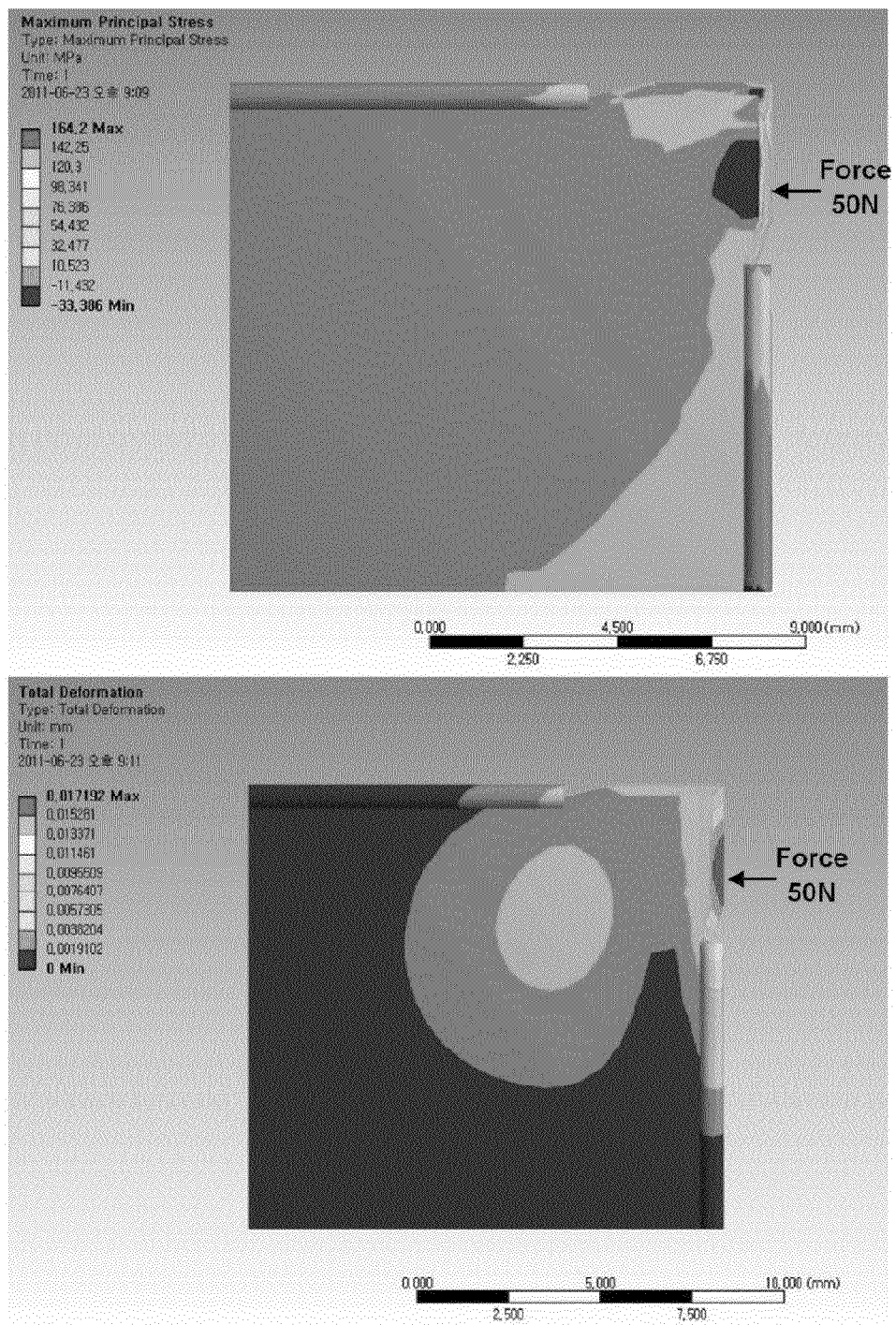
FIG. 6 is a data sheet including simulation resultants for the strength of a bottom cover with hemming portions and stepped portions.

FIG. 5 is a data sheet including simulation resultants for the strength of a bottom cover with hemming portions. FIG. 6 is a data sheet including simulation resultants for the strength of a bottom cover with hemming portions and stepped portions.

As seen from FIG. 5, a stress of 246.02N is generated in the bottom cover with only the hemming portions when an external force of 50N is applied to the bottom cover. In this case, the bottom cover is inwardly deformed by about 0.0234 mm.

Referring to FIG. 6, a stress of 164.2N is generated in the bottom cover of the present disclosure provided with the hemming portions and the stepped portions when an external force of 50N is applied to the bottom cover. Also, the bottom cover is inwardly deformed by about 0.0172 mm when the external force of 50N is applied to the bottom cover.

The stress generated in the bottom cover with the hemming portions and the stepped portions decreases by about 81.82N compared to that generated in the bottom cover with only the hemming portions. Also, the deformation of the bottom cover with the hemming portions and the stepped portions is reduced by 0.0062 mm compared to the bottom cover with only the hemming portions.

As described above, the bottom cover of the present disclosure provided with the hemming portions and the stepped portions can reduce the stress caused by an external force when the external force is applied. Therefore, the strength of the LCD device can be enhanced.

Also, the bottom cover according to the present disclosure allows additional areas to be provided for its bottom surface by means of the stepped portions. As such, the support main can become thicker. Therefore, an impact caused by an external force and transferred to the LCD panel and backlight unit, which are supported by the support main, can be minimized. As a result, the reliability of the LCD device can be enhanced.

The ordinary skilled person in the art should understand that various changes or modifications of the present disclosure are possible without departing from the technical spirit or the essential features of the present disclosure. As such, it should be understood by the ordinary skilled person in the art that the above-mentioned embodiments are provided as examples of the present disclosure, but the present disclosure is not limited these embodiments. Accordingly, the scope of the present disclosure shall be determined only by the appended claims and their equivalents. Moreover, it should be considered that alternative uses derived from the meaning, scope and their equivalent concepts defined in the claims are included in the scope of the present disclosure.

What is claimed is:

1. A liquid crystal display (LCD) device comprising:
   an LCD panel;
   a backlight unit configured to apply light to the LCD panel;
   a bottom cover configured to receive the LCD panel and the backlight unit and include a bottom surface, which supports the backlight unit, and bending processed hemming portions extended from four edges of the bottom surface; and
   a support main disposed between the bottom cover and the outsides of the LCD panel and the backlight unit,
   wherein the hemming portions include first and second hemming portions facing each other,
   wherein the bottom cover further includes: a first stepped portion extended from one side of the first hemming portion; a second stepped portion extended from one side of the second hemming portion; a first side wall disposed on a first corner of the bottom surface and extending from the first stepped portion; a second side wall disposed on a second corner of the bottom surface and extending from the second stepped portion; and a third side wall disposed on the first corner of the bottom surface and extending from one side of a third stepped portion,
   wherein a first distance between inner surfaces of the first side wall and the second side wall in a direction perpendicular to the first and second side walls is longer than a second distance between inner surfaces of the first hemming portion and the second hemming portion in the direction perpendicular to the first and second side walls,
   wherein the first, second and third stepped portions are inwardly inclined at a fixed angle from an edge of the bottom surface, and
   wherein the first stepped portion, the first side wall, the third side wall, and the third stepped portion are a single continuous piece corner.

2. The LCD device of claim 1, wherein the first and second stepped portions have one of a flat surface shape and a curved surface shape.

3. The LCD device of claim 1, wherein the first and second stepped portions have an uneven pattern shape.

4. The LCD device of claim 1, wherein the hemming portions of the bottom cover are separated by less than 1.5 mm from the first or second corner of the bottom surface.

5. The LCD device of claim 1, wherein the first side wall and second side wall are in a lower height than that of the hemming portions.

6. A bottom cover comprising:
a bottom surface supporting a backlight unit; and
bending processed first, second, third and fourth hemming portions extended from four edges of the bottom surface;
a first stepped portion extended from one side of the first hemming portion;
a second stepped portion extended from one side of the second hemming portion;
a third stepped portion extended from one side of the third hemming portion;
a first side wall disposed on a first corner of the bottom surface and extending from the first stepped portion;
a second side wall disposed on a second corner of the bottom surface and extending from the second stepped portion;
a third side wall disposed on the first corner of the bottom surface and extending from one side of the third stepped portion,
wherein a first distance between inner surfaces of the first side wall and the second side wall in a direction perpendicular to the first and second side walls is longer than a second distance between inner surfaces of the first hemming portion and the second hemming portion in the direction perpendicular to the first and second side walls,
wherein the first, second and third stepped portions are inwardly inclined at a fixed angle from an edge of the bottom surface, and
wherein the first stepped portion, the first side wall, the third side wall, and the third stepped portion are a single continuous piece corner,
the first and second hemming portions are facing each other, and
the third and fourth hemming portions are facing each other.

7. The bottom cover of claim 6, wherein the first, second and third stepped portions have one of a flat surface shape and a curved surface shape.

8. The bottom cover of claim 6, wherein the first, second and third stepped portions have an uneven pattern shape.

9. The bottom cover of claim 6, wherein the hemming portions of the bottom cover are separated by less than 1.5 mm from the first or second corner of the bottom surface.

10. The bottom cover of claim 6, wherein the first side wall and second side wall are in a lower height than that of the hemming portions.

* * * * *